United States Patent
Marry et al.

(10) Patent No.: US 7,082,417 B1
(45) Date of Patent: Jul. 25, 2006

(54) METHOD OF CALCULATING MAILROOM CHARGEBACK COST FOR INCOMING MAILS

(75) Inventors: Richard D. Marry, Milford, CT (US); Robert K. Gottlieb, Milford, CT (US); Edward P. Daniels, Jr., Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/474,909

(22) Filed: Dec. 28, 1999

(51) Int. Cl.
*G06F 17/00* (2006.01)
*B65B 35/00* (2006.01)

(52) U.S. Cl. ............ 705/402; 705/406; 705/410; 209/584; 209/900; 364/401; 364/406; 364/408; 700/30; 700/400

(58) Field of Classification Search ........... 364/406, 364/401, 408; 705/400, 403, 406, 402, 410; 209/584, 900; 700/30, 400
See application file for complete search history.

(56) References Cited

U.S. PATENT DOCUMENTS

| | | | | |
|---|---|---|---|---|
| 4,713,761 | A * | 12/1987 | Sharpe et al. | 364/406 |
| 5,257,196 | A * | 10/1993 | Sansone | 705/403 |
| 5,308,932 | A * | 5/1994 | Manduley et al. | 177/25 |
| 5,535,127 | A | 7/1996 | Uno et al. | 364/464.02 |
| 5,794,222 | A | 8/1998 | Wakabayashi et al. | 705/404 |
| 6,047,807 | A * | 4/2000 | Molbak | 194/217 |
| 6,283,304 | B1 * | 9/2001 | Gottlieb et al. | 209/603 |

FOREIGN PATENT DOCUMENTS

| | | | |
|---|---|---|---|
| DE | 3731508 A | * | 9/1987 |
| JP | 408204892 A | * | 8/1996 |

OTHER PUBLICATIONS

Post Regs deliver innovation; Purchasing; Boston; Aug. 14, 1997; Susan Avery.*

(Continued)

*Primary Examiner*—Dean Tan Nguyen
(74) *Attorney, Agent, or Firm*—Steven J. Shapiro; Angelo N. Chaclas

(57) ABSTRACT

This invention overcomes the disadvantages of the prior art by providing a method of calculating sorting costs for incoming mail. The foregoing is accomplished by providing a method that can determine the number and types of mailpieces being sorted and associated that number with addressee information. The combination of the number and types of mailpieces being sorted for the addressees can then be used to calculate a charge back amount by using a predetermined cost per mailpiece. Thus, the present invention is directed to, in a general aspect, a method of calculating sorting costs for an incoming mail sorting apparatus having a database of addressees for use in sorting incoming mailpieces comprising the steps of: collecting information about each one of a plurality of mailpieces sorted using the incoming mail sorting apparatus, the information used to determine a type of mailpiece for each one of the plurality of mailpieces; determining the type of mailpiece using the information collected; and associating the information about each one of the plurality of mailpieces sorted using the incoming mail sorting apparatus with addressee information from the database of addressees; and calculating a piece count for each mailpiece for each addressee.

3 Claims, 3 Drawing Sheets

OTHER PUBLICATIONS

"How to cut costs in your mailroom", Mar. 1978.*
"Postal Rate Increases Deliver Latest Skirmish", Jun. 1984.*
"Sorting the Mail", Apr. 28, 1988.*
"Title " Letter mail Sorting: An Examination of cost and Service, 1971.*
Peoples, J.E. "Mission Possible . . . System", Inform v12n7, pp. 30-34, Jul. 1998, Dialog File 15, No. 0167 7203.*
"Mailroom Automation . . . Mailers", Managing Office Tech, v40, n8, p. 22(5), Aug. 1995, Dialog File 148, No. 0812 8561.*
Hanh, P.M. "Modeling the Postal OCR", 1970, IEEE Publication, Dialog File 2, No. 0026 3488.*
Asner, M. "Sorting the Mail", Computing Canada, v14, n9, p. 24(1), Apr. 1988, Dialog File 275, No. 0122 1728.*

* cited by examiner

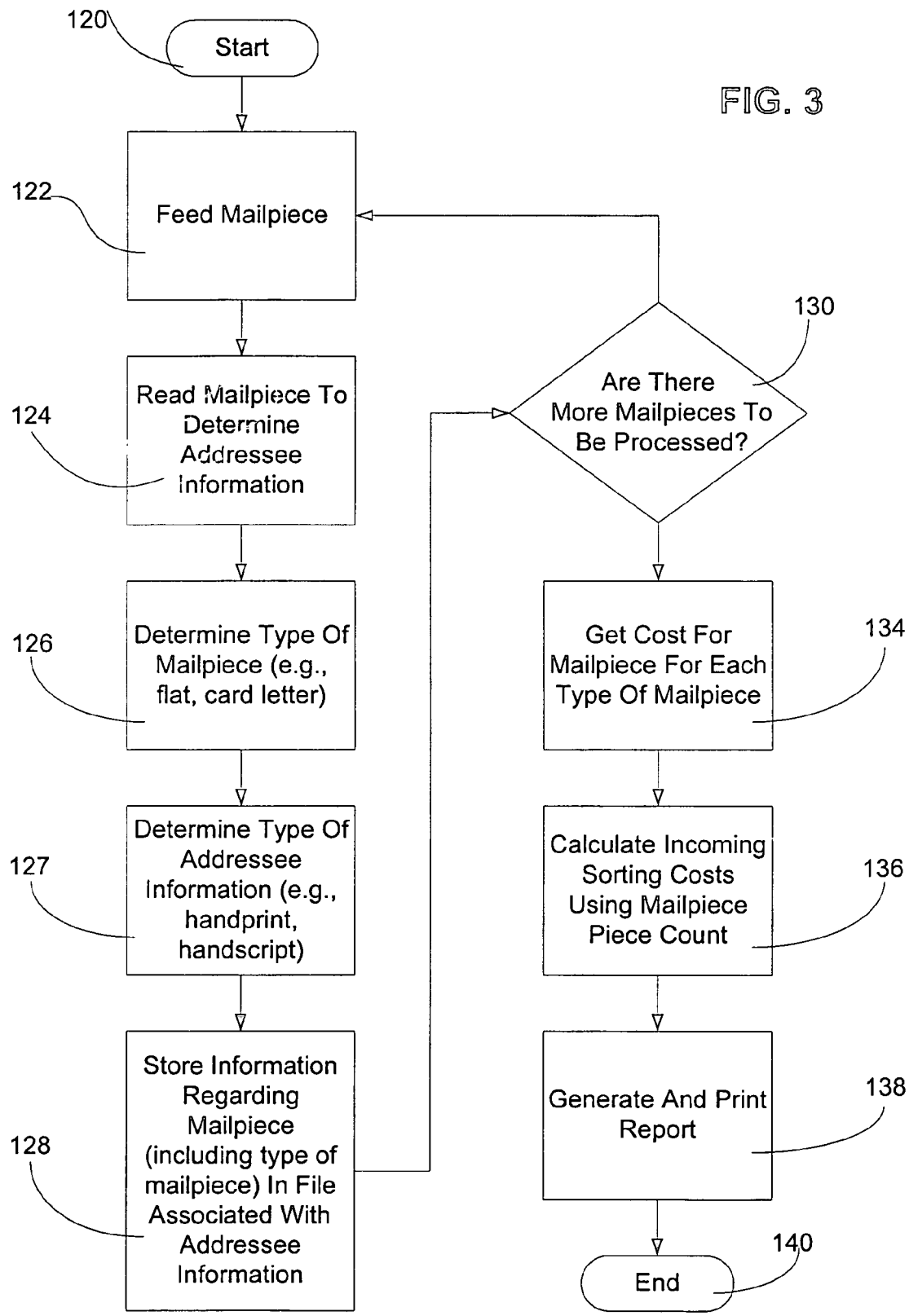

METHOD OF CALCULATING MAILROOM CHARGEBACK COST FOR INCOMING MAILS

FIELD OF THE INVENTION

The invention disclosed herein relates generally to automated mail sorting and more particularly, a method for calculating sorting costs for charge back accounting for a mail sorting apparatus.

RELATED APPLICATIONS

Reference is made to application Ser. No. 09/474,908 titled METHOD OF REMOVING MAIL FROM THE MAILSTREAM USING A MAIL SORTING APPARATUS, assigned to the assignee of this application and filed on even date herewith, now U.S. Pat. No. 6,508,365.

BACKGROUND

The processing and handling of mailpieces consumes an enormous amount of human and financial resources, particularly if the processing of the mailpieces is done manually. The processing and handling of mailpieces not only takes place at the Postal Service, but also occurs at each and every business or other site where communication via the mail delivery system is utilized. That is, various pieces of mail generated by a plurality of departments and individuals within a company need to be addressed, collected, sorted and franked as part of the outgoing mail process. Additionally, incoming mail needs to be collected and sorted efficiently to ensure that it gets to the addressee in a minimal amount of time. Since much of the documentation and information being conveyed through the mail system is critical in nature relative to the success of a business, it is imperative that the processing and handling of both the incoming and outgoing mailpieces be done efficiently and reliably so as not to negatively impact the functioning of the business. Additionally, it would be helpful if the expense of the time consuming task of sorting the mail could be accounted for and charged back to various departments of the company for which the mail is being sorted.

Mailroom expenses have typically been charged to various departments of the company that a mailroom serves by using allocation accounting methods. The total cost of running the mailroom is calculated and a percentage of that cost is allocated to each department that a mailroom serves. The percentage could be calculated for example, by using a square footage calculation such that a department that occupies 10% of the square footage of a building which the mailroom provides services to is allocated 10% of the mailroom cost. The allocation method however is inexact. Another method of attributing mailroom costs to the departments that the mailroom provides services to, is to charge back metering costs for outgoing mail. This is called post-centric charge back and is used for outgoing mail. Outgoing mail needs to be affixed with proper postage. Postage meters used to frank mailpieces can include accounting functionality that allow postage costs to be attributed to the department from which the mail originated. This method allows for more precise chargeback of the departments. However, this method is only available for outgoing mail. The distribution of mailroom costs for incoming mail still relies on allocation methods. Incoming mail has been franked at its origin and therefore, simply needs to be sorted and distributed upon arriving at the addressee's mailroom.

Various automated mail handling machines have been developed for processing incoming mail (removing individual pieces of mail from a stack and performing subsequent actions on each individual piece of mail). Generally, the mail handling machines separate individual mailpieces from a stack, read the mailpieces using an optical character recognition system (OCR) and compare the read information to an addressee database in order to determine the appropriate destination points for delivery of the mailpieces. However, these mail handling machines do not include functionality that would track the numbers and types of mailpieces that are sorted for each of the departments of the company for which the mail is being sorted, and calculate a charge back amount for accounting of mailroom expenses.

Thus, one of the problems of the prior art is that a system is not available for calculating charge back costs for incoming mail sorting. Another problem of the prior art is that expense allocation can be imprecise. Yet another problem of the prior art is that incoming mail handling machines do not provide detailed information for charge back accounting. Therefore, a method that calculates charge back cost of incoming mail sorting is needed

SUMMARY OF THE INVENTION

This invention overcomes the disadvantages of the prior art by providing a method of calculating sorting costs for incoming mail. The foregoing is accomplished by providing a method that can determine the number and types of mailpieces being sorted and associated that number with addressee information. The combination of the number and types of mailpieces being sorted for the addressees can then be used to calculate a charge back amount by using a predetermined cost per mailpiece. Thus, the present invention is directed to, in a general aspect, a method of calculating sorting costs for an incoming mail sorting apparatus having a database of addressees for use in sorting incoming mailpieces comprising the steps of: collecting information about each one of a plurality of mailpieces sorted using the incoming mail sorting apparatus, the information used to determine a type of mailpiece for each one of the plurality of mailpieces; determining the type of mailpiece using the information collected; and associating the information about each one of the plurality of mailpieces sorted using the incoming mail sorting apparatus with addressee information from the database of addressees; calculating a piece count for each mailpiece for ah addressee; and calculating a charge back amount from the piece count and a predetermined cost.

Thus, an advantage of the method of the present invention is that it provides a method of calculating charge back costs for incoming mail sorting. Other advantages of the invention will in part be obvious and will in part be apparent from the specification. The aforementioned advantages are illustrative of the advantages of the various embodiments of the present invention.

BRIEF DESCRIPTION OF THE DRAWINGS

FIG. 3 is a flowchart of an embodiment of the method of calculating sorting charges in an incoming mail sorting apparatus.

DETAILED DESCRIPTION OF THE PRESENT INVENTION

Figure 1:
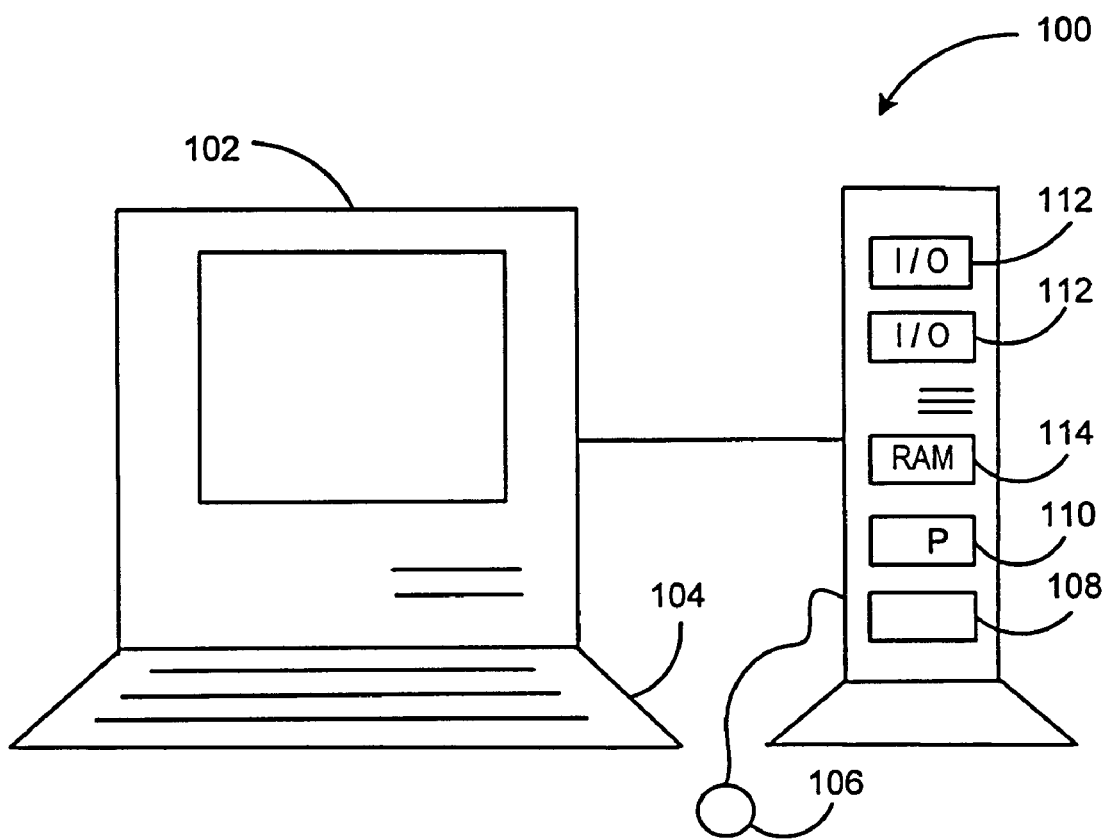
FIG. 1 is a block diagram that illustrates a computer system upon which an embodiment of the invention may be implemented.

In describing the present invention, reference will be made herein to FIGS. 1–3 of the drawings in which like numerals refer to like features of the invention. Features of the invention are not necessarily shown to scale in the drawings.

Hardware Overview

FIG. 1 is a block diagram that illustrates a computer system 100 upon which an embodiment of the invention may be implemented. Computer system 100 may be a personal computer which is used generically and refers to present and future microprocessing systems with at least one processor operatively coupled to user interface means, such as a display 102 and keyboard 104, and/or a cursor control, such as a mouse or a trackball 106, and storage media 108. The personal computer 100 may be a workstation that is accessible by more than one user. The personal computer also includes a conventional processor 110, such as the Pentium II™ microprocessors manufactured by Intel, and conventional memory devices such as hard drive 108, floppy drive(s) 112, and memory 114.

Figure 2:
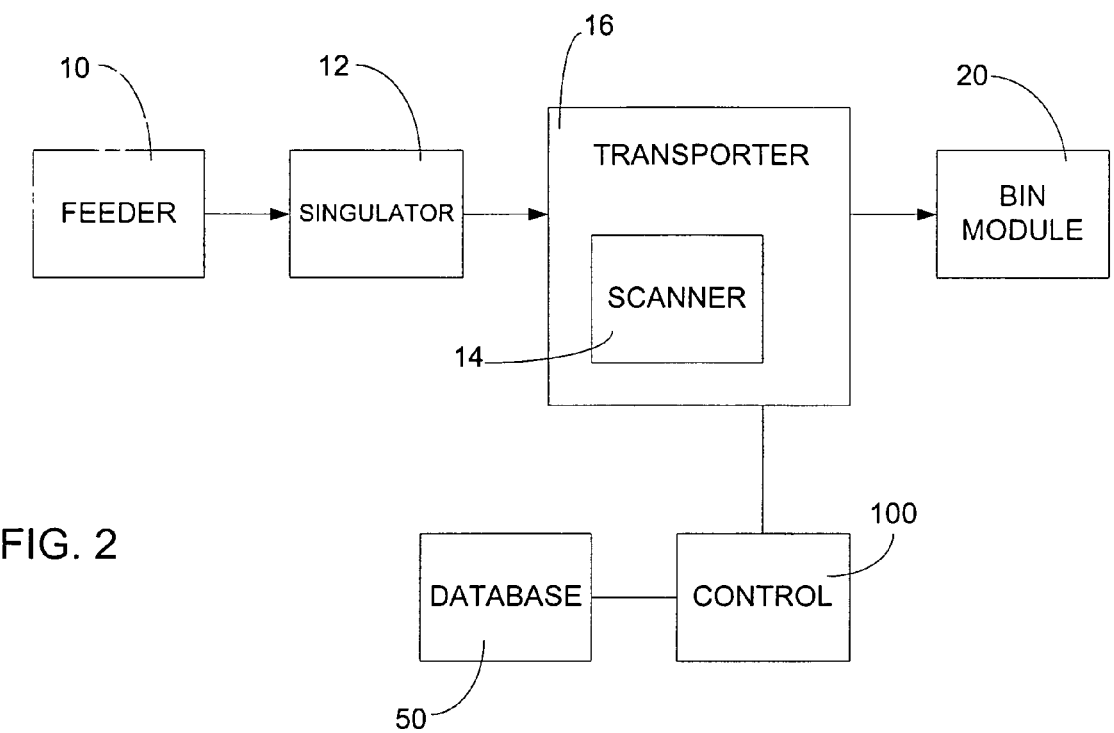
FIG. 2 illustrates the connection of the computer system to the sorting apparatus.

The computer system is connected to a sorting apparatus 8 as illustrated in FIG. 2. The mailpiece sorting apparatus 8 may generally comprise a feeder 10, a scanner 14 (and OCR software, now shown), a mailpiece transporter 16, compartments or bins 20 for receiving sorted mailpieces, and a control system which may be the microprocessor based personal computer system 100 described above. The system may be controlled by a microprocessor controller 100 such as, for example the personal computer 100 with a Pentium II™ microprocessor, which computer 100 is coupled to a database (memory devices) 50 as discussed below. The microprocessor can run an operating system such as a QNX operating system which provides real-time control of the components of the mailpiece sorting apparatus 8. The computer includes appropriate memory devices 108, 114 for storage of information such as an address database. One of ordinary skill in the art would be familiar with the general components of the sorting apparatus upon which the method of the present invention may be performed.

The mail sorting apparatus 8 may determine the length and thickness of the mailpieces being sorted through the use of sensors (not shown) in the mail sorting apparatus and timing information regarding the amount of time it takes a mailpiece to pass a particular sensor. This information may be used to determine the type of mailpiece being sorted. Additionally, the OCR software may be used to determine the type of addressee information on the mailpiece that is being sorted. That is, OCR has the ability to determine whether a mailpiece is addressed using hand script, hand print, machine print, interoffice envelope and interoffice form envelope. The distinguishment between an interoffice envelope and an interoffice form envelope is that the form envelope is easier to read because the information on the envelope is in standardized positions. Some mailpieces may be unreadable, those mailpiece require reprocessing which may be manual.

The present invention is related to the use of computer system 100 connected to the mailpiece sorting apparatus 8 for performing application software methods. The method of the present invention is used to calculate incoming mail sorting charges for charge back accounting for a mail room. However, the method could also be used to calculate outgoing mail sorting charges.

Calculating Sorting Charges

FIG. 3 is a flowchart of an embodiment of the method of calculating sorting charges. At step 120, the method begins. At step 122, the mailpieces are fed using the mail sorting apparatus 8. At step 124 the mailpieces are read and addressee information is determined. The addressee information could be for example, the addressee's name, delivery point code or other suitable information. At step 126, the type of mailpiece is determined. The mailpiece may be determined to be a letter, a flat, a postcard or other type of mailpiece distinguishable by length and thickness. At step 127, the type of addressee information is determined to be hand printed, hand script, machine print, interoffice, interoffice form or other distinguishable addressee information type. The type of addressee information can be an important factor in determining sorting costs since certain information, such as hand script, can be more difficult to read using a scanner and OCR and thus, requires more processing time and cost more to process. At step 128, information regarding the mailpiece type and address information type is stored in the computer system 100 log file which associates the information with the addressee and/or the addressee's department or the like. The stored information is cumulative, thus, there will be a piece count for each mailpiece type and addressee information type associated with, for example, each department. The piece count is incremented by one each time it is determined that a sorted mailpiece falls into a particular category. That is, the category for the addressee and the total are incremented by one. At step 130, a query is made as to whether there are more mailpieces to be processed. If at step 130, there are additional mailpieces to be processed, the method continues from step 122 as described above.

If at step 130, there are no more mailpieces to be processed, then at step 134 a cost per mailpiece type and address information type is input to the computer system 100. The cost per mailpiece type and/or addressee information type could also be stored in the computer system 100 for future use or could be stored prior to the execution of the method. Additionally, the cost per mailpiece type and/or addressee information type can be edited as needed. For example, where only mailpiece type information is being distinguished, letters may cost $0.01 each, and postcards may cost $0.05 each. Or, where mailpiece and addressee information type information is being distinguished, letters that are addressed in hand script may cost $0.03 to sort, and letters that are machine printed may cost $0.01 to sort. At step 136, total costs are calculated using the cumulative stored information regarding the mailpieces. At step 138, a total cost report is generated and printed. Alternately, the report may be electronically transferred to another computer system (not shown) by electronic mail or other suitable electronic format. The total cost report may be formatted as needed for charge backs, for example, by total cost for each department or by total cost for each division of the company. The reports can be broken down by total cost for each type of mailpiece and total aggregate cost for all mailpieces.

Tables A and B illustrate the types of formats that may be used to report costs. Other formats as may be appropriate can also be created. At step 140, the method ends. Table A reports department costs for types of mailpieces individually and in aggregate. The cost per mailpiece in Table A is $0.04 for letters and $0.05 for flats. Table B reports department costs for types of mailpieces; the report is broken down by type of mailpieces for each individual in a department. The cost per mailpiece is $0.04 for letters, $0.02 for postcards and $0.06 for flats. It should be noted that in Table A each department has a delivery point code and that each person in that department would have the same delivery point code. Additionally, in Table B each person in a department has a unique delivery point code. The delivery point code uniqueness is tied to the level of precision that a report can be generated. Thus, where all individuals have the same delivery point code, as in Table A, the break down as shown in Table B would not be possible since the sorting and piece count is tied to the delivery point code. It should also be noted that the example sorting using delivery point code is an embodiment of the present invention and is not meant to limit the method of the present invention. Other suitable sorting methods may be used as determined by one of ordinary skill in the art.

TABLE A

| DEPARTMENT NAME | NUMBER OF MAILPIECES | NUMBER OF FLAT | NUMBER OF LETTERS | NUMBER OF POST CARDS | TOTAL COST | DELIVERY POINT CODE |
|---|---|---|---|---|---|---|
| Account Services | 6 | 0 | 6 | 0 | $0.24 | 27-00 |
| Corporate Compensation | 2 | 0 | 2 | 0 | $0.08 | 26-01 |
| Engineering Lab | 2 | 1 | 1 | 0 | $0.09 | 24-03 |
| TOTALS | 15 | 2 | 13 | 0 | $0.62 | |

TABLE B

| DEPARTMENT NAME | LAST NAME | FIRST NAME | # OF MAILPCS | # OF FLATS | # OF LETTERS | # OF CARDS | TOTAL COST | DPC |
|---|---|---|---|---|---|---|---|---|
| ACCOUNT SERVICES | Nielson | Leslie | 2 | 0 | 1 | 1 | $0.06 | 27 00 |
| | Fisher | Ed | 1 | 0 | 1 | 0 | $0.04 | 11 11 |
| | Thomas | Walter | 2 | 1 | 1 | 0 | $0.10 | 11 05 |
| | Totals for ACCOUNT SERVICES: | | 5 | 1 | 3 | 1 | $0.20 | |
| CORPORATE COMPENSATION | Anderson | Judith | 1 | 0 | 1 | 0 | $0.04 | 33 02 |
| | Williams | Andy | 3 | 2 | 1 | 0 | $0.16 | 02 00 |
| | Totals for CORPORATE COMP: | | 4 | 2 | 2 | 0 | $0.20 | |
| ENGINEERING LAB | Taylor | Elizabeth | 1 | 3 | 1 | 2 | $0.26 | 54 19 |
| | Totals for ENGINEERING LAB: | | 6 | 3 | 1 | 2 | $0.26 | |

In an alternate embodiment only mailpiece type information is determined as in step 126 and no addressee type information is determined or stored. In another alternate embodiment, only addressee type information is determined, as in step 128 and no mailpiece type information is determined or stored. Yet in another alternate embodiment, at step 134, labor costs and sort times may be entered and used to calculate sorting costs. In another embodiment, price per mailpiece is entered for each department at step 134, and thus charges for mail delivery vary by department.

The method of the present invention provides a way to account for costs of sorting incoming mailpieces. Reports containing cost information may be generated in a preferred format and forwarded to a person needing that information for accounting or other purposes. Thus, the method of the present invention provides sorting charge back information that reflects the incoming mail sorting that is performed by the mailroom. The system can be mailpiece type centric and/or addressee information type centric. Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims.

What is claimed is:

1. A method of for improving the accuracy for determining mailroom chargeback cost for addressees using an incoming mail sorting apparatus having a database of addressees for use in sorting incoming mailpieces comprising the steps of:

a) collecting information about each one of a plurality of mailpieces sorted using the incoming mail sorting apparatus, the information used to determine a type of mailpiece and a type of addressee information for each one of the plurality of mail pieces;

b) determining the type of mailpiece using the information collected in step a);

c) associating the information about each one of the plurality of mailpieces sorted using the incoming mail sorting apparatus with addressee information from the database of addressees;

d) storing a piece count for each one of the plurality of mailpieces sorted using the incoming mail sorting apparatus, the piece count stored in association with corresponding addressee information from the database of addressees and said determined type of mailpiece in the incoming mail sorting apparatus;

e) calculating mailroom chargeback cost for a plurality of sorted mailpieces using the piece counts stored in association with corresponding addressee information from the database of addressees and a predetermined unit price for each type of mailpiece and the piece count for each type of mailpiece; and f) outputting said mailroom chargeback cost.

2. The method as claimed in claim 1 wherein the information about each one of the plurality of mailpieces comprises a type of mailpiece selected from the group consisting of: a letter, a flat and a postcard.

3. The method as claimed in claim 1 wherein the information about each one of the plurality of mailpieces comprises a type of addressee information selected from the group consisting of: hand print, hand script, interoffice and interoffice form.

* * * * *